Figure 1:
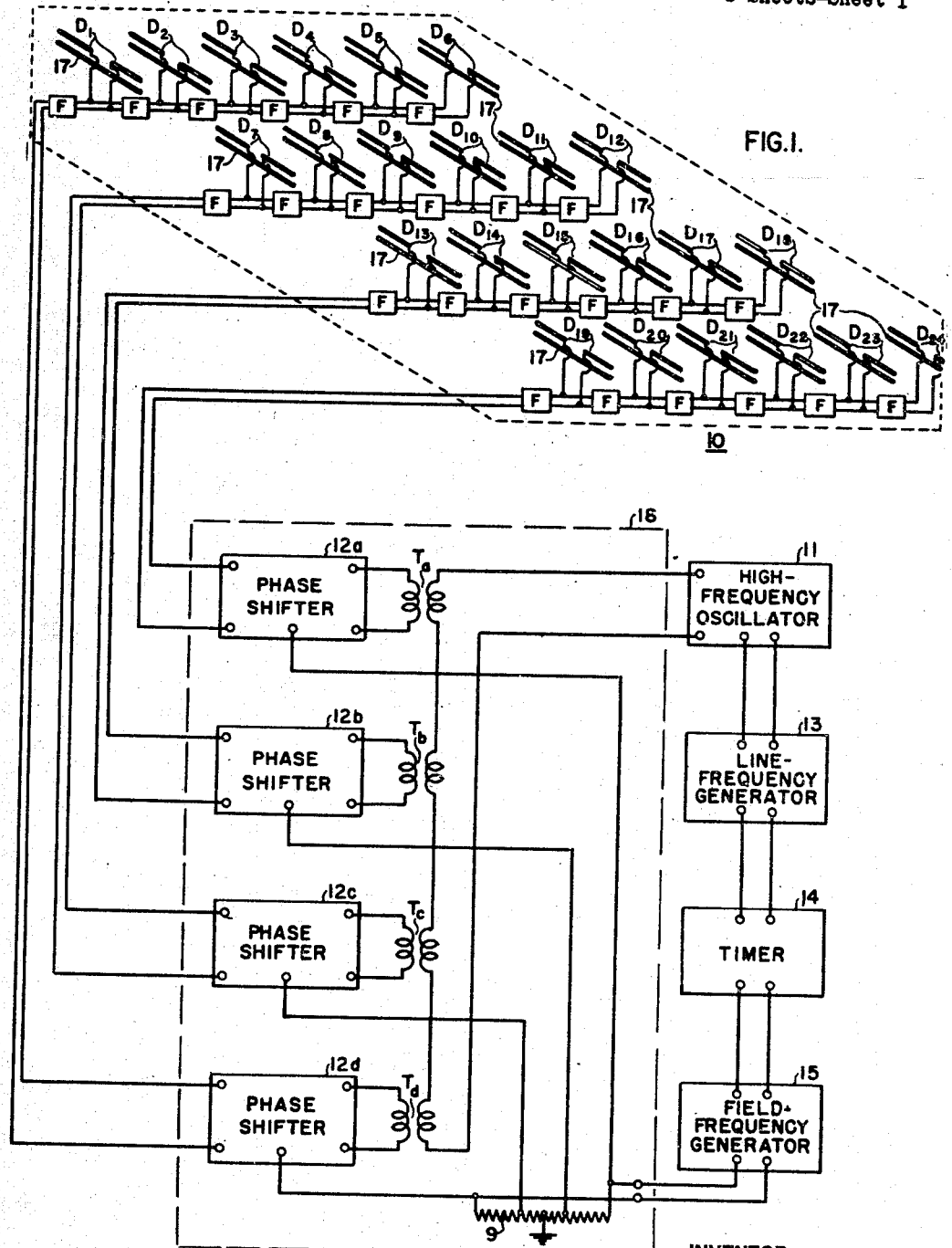

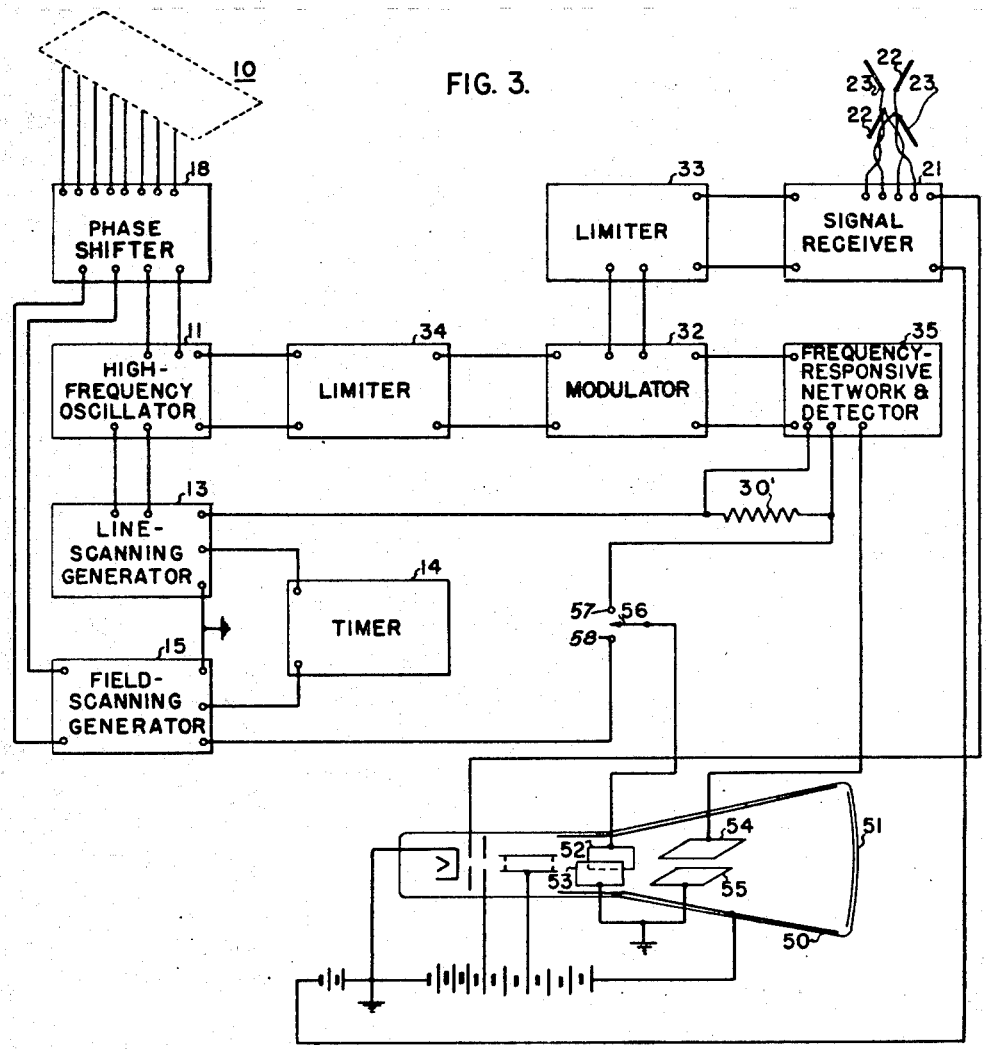

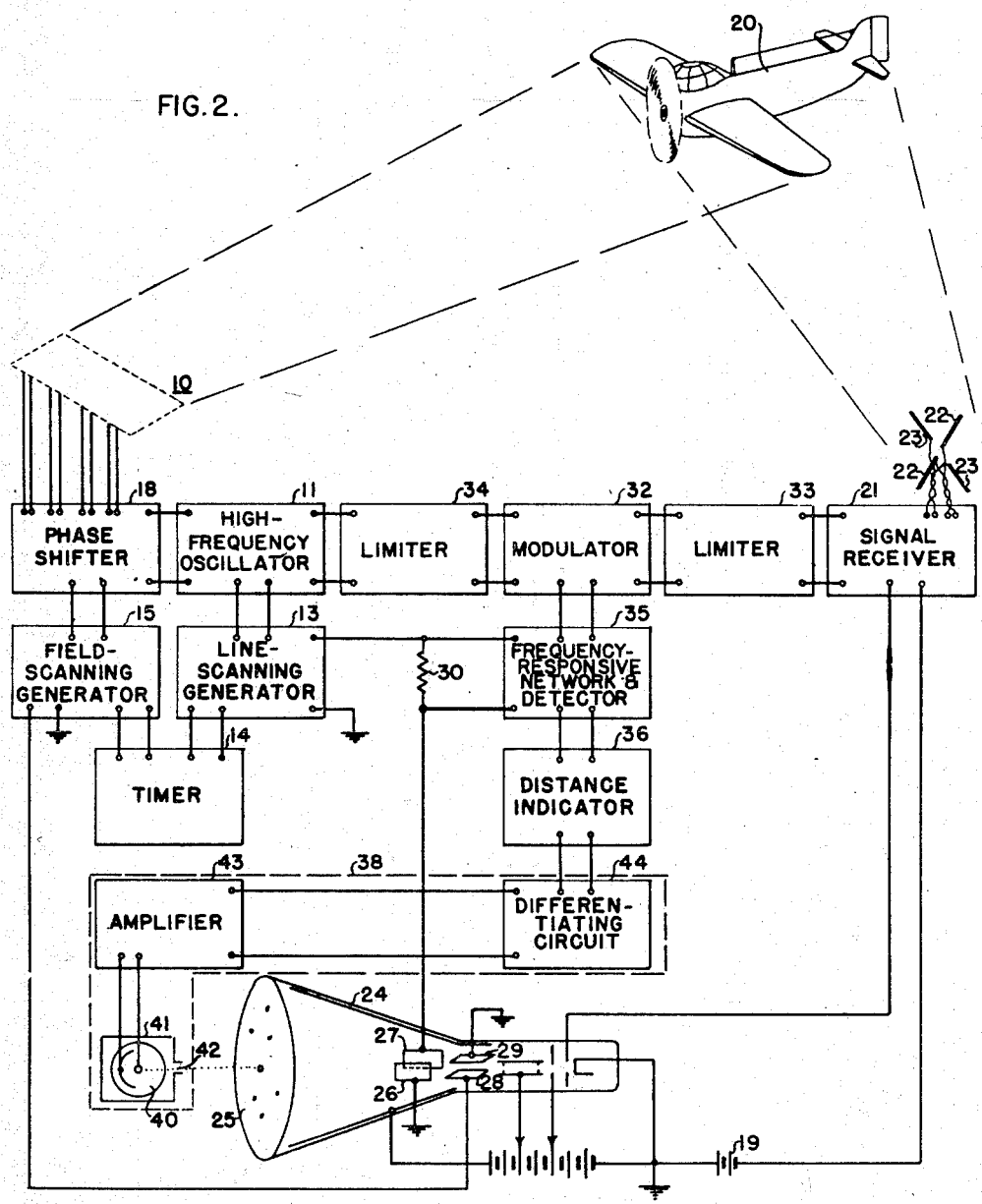

Patented Sept. 3, 1946

2,407,169

UNITED STATES PATENT OFFICE 2,407,169

SYSTEM FOR LOCATING RADIATED-SIGNAL REFLECTORS

Arthur V. Loughren, Great Neck, N. Y., assignor, by mesne assignments, to Hazeltine Research, Inc., Chicago, Ill., a corporation of Illinois Application May 26, 1941, Serial No. 395,172

9 Claims. (Cl. 250—1)

This invention relates to radiated-signal reflector locating systems and, particularly, to such systems of the type in which a predetermined space is scanned with a sharply-concentrated radiated beam in order to locate a radiated-signal deflector, such as an aircraft.

It has been proposed in aircraft locating systems to scan a predetermined space in two directions with a sharply-concentrated radiated beam of wave signals and to receive the signal which is reflected from the aircraft to provide an indication of its direction from the locating station. It has also been proposed to deflect the radiated beam at a different frequency in each of two directions in order to scan a given space and to utilize a cathode-ray tube at the receiving station as the direction-indicating device, the electron beam of the cathode-ray tube being deflected synchronously with the deflection of the radiated beam. However, such systems of the prior art have had the disadvantage that mechanical beam-deflecting arrangements were necessary for causing the radiated beam to scan the desired space. The general disadvantages of mechanical scanning arrangements are well understood by those skilled in the television art and many of these disadvantages are also present in mechanical scanning arrangements of the type under consideration.

It is an object of the present invention, therefore, to provide an improved system for determining the direction from a locating station of a radiated-signal reflector, such as an aircraft.

It is still another object of the invention to provide an improved system for determining the direction of, and the distance to, a radiated-signal reflector, such as an aircraft, from a locating station.

In accordance with a feature of the invention, a system for locating a radiated-signal reflector comprises a radiating system having a radiation characteristic effectively in the form of a sharply-concentrated beam, means for applying a carrier signal to the radiating system, and means for varying the frequency of the carrier signal to scan a predetermined space in at least one direction with the beam. The system also includes means for receiving energy from the radiated beam reflected from the reflector and for utilizing the received energy to indicate the direction of the reflector, and means responsive jointly to the aforesaid frequency-modulated signal and the reflected signal for determining the distance of the radiated-signal reflector from the locating system.

Also in accordance with a feature of the invention, the last-mentioned system may include a reproducing device including an indicating area corresponding to the predetermined space scanned by the radiated beam, means responsive to the received energy for producing an indication thereof of restricted area on the indicating area, and means for scanning the reproducing device in synchronism with the radiated scanning beam. By this arrangement, the position of the indication on the indicating area is dependent upon the direction of said radiated-signal reflector.

Also in accordance with a feature of the invention, a system for locating a radiated-signal reflector comprises, a radiating system having a radiation characteristic effectively in the form of a sharply-concentrated beam, means for applying a carrier signal to said radiating system, and means for scanning a predetermined space with the beam. This system also comprises means for receiving energy from the radiated beam reflected from the reflector and for utilizing the received energy to indicate the approximate direction of the reflector, and means for compensating the indication for the time required for the received energy to travel from said radiating system to said means for receiving the radiated beam reflected from the reflector.

For a better understanding of the invention, together with other and further objects thereof, reference is had to the following description taken in connection with the accompanying drawings and its scope will be pointed out in the appended claims.

Fig. 1 of the drawings is a circuit diagram, partly schematic, of a system for scanning a predetermined space with a sharply-concentrated radiated beam of wave signals; Fig. 1a comprises a set of graphs which are used in explaining a portion of the operation of the arrangement of Fig. 1; Fig. 2 is a circuit diagram, partly schematic, of a system embodying the beam-radiating system of Fig. 1 for locating a radiated-signal reflector, such as an aircraft; while Fig. 3 is a circuit diagram, partly schematic, of a modification of the radiated-signal reflector locating system of Fig. 2.

Referring now more particularly to Fig. 1 of the drawings, the system there represented is disclosed and claimed in a divisional application Serial No. 418,712, filed Nov. 12, 1941. The system comprises an antenna or radiating system 10, means for applying a wave signal to the antenna system for directive radiation effectively in the form of a sharply-concentrated beam, and means for cylically varying the frequency of the wave signal and, by virtue of the antenna characteristics as described hereinafter, causing the beam to scan a predetermined space in one direction. The antenna system 10 includes a plurality of directional signal radiators shown as dipoles $D_1$–$D_{24}$, inclusive, geometrically spaced in two dimensions and electrically spaced in one dimension. Specifically, the conductors of the dipoles are all disposed in the same horizontal plane and are parallel to each other. Dipoles $D_1$–$D_6$, inclusive, are spaced in a first dimension in a longitudinal array, while the sets of dipoles $D_7$–$D_{12}$, inclusive, $D_{13}$–$D_{18}$, inclusive, and $D_{19}$–$D_{24}$, inclusive, are similarly spaced in other horizontal arrays and are arranged, in the order named, to one side of the set of dipoles $D_1$–$D_6$, inclusive, to form an array of dipole sets, each set including an array of six dipole antennae and the sets being spaced in a second dimension. The dipoles of each of the above-mentioned sets of dipoles are energized in parallel except that the above-mentioned electrical spacing in the one dimension between the individual dipoles of the sets is provided by delay networks F interposed between adjacent dipoles. The geometrical spacing of the dipoles in each set in the above-mentioned one dimension is preferably made approximately one-half wave length of the mean or nominal frequency of the wave signal to be applied to the system, while the electrical spacing due to delay networks F, F is made to be an integral number of wave lengths at the nominal or mean frequency of the system. The sets of dipoles are also preferably spaced in the dimension normal to the sets, or in the above-mentioned second dimension, by a distance approximately equal to one-half the wave length of the mean or nominal frequency of the wave signal to be applied to the system.

The means for applying a wave signal to the antenna system 10 for directive radiation effectively in the form of a sharply-concentrated beam comprises a high-frequency oscillator 11 of any suitable type adapted for frequency modulation individually coupled to each of the sets of dipoles through transformers $T_a$, $T_b$, $T_c$, and $T_d$ having their primary windings connected in series and coupled to the high-frequency oscillator 11 and their respective secondary windings coupled to the above-mentioned sets of dipoles through phase shifters 12a, 12b, 12c, and 12d, respectively, which have the same phase shift at the nominal or mean value of the field-frequency generator.

In order to vary the relative phase of the signals as applied to the signal radiators of antenna system 10 which are spaced in the above-mentioned one dimension at a first predetermined frequency, there is provided means for varying in a predetermined cyclic manner the frequency of the signal developed by the high-frequency oscillator 11 at the above-mentioned first predetermined frequency. Specifically, there is provided a line-frequency generator 13 which is adapted to be synchronized from a timer 14, the output circuit of the line-frequency generator 13 being coupled to high-frequency generator 11 in order to vary the output frequency of this unit in accordance with the wave form of the signal developed by line-frequency generator 13, in any conventional manner.

In order to vary the relative phase of the signals as applied to the signal radiators of antenna 10 which are spaced in the above-mentioned second dimension at a second predetermined frequency, there is provided a field-frequency generator 15, also adapted to be synchronized by timer 14 and having an output circuit coupled across a voltage-divider resistor 9, the mid-tap of which is grounded. A control voltage is derived from one end of resistor 9 and utilized to control phase shifter 12a while a voltage of opposite polarity is derived from the other end of resistor 9 and utilized to control phase shifter 12d. Control voltages for phase shifters 12b and 12c are derived from intermediate points on resistor 9 as illustrated in the drawings. The phase shifters 12a–12d, inclusive, may be of any conventional type and it is to be understood that the phase shift of each of these units is dependent upon the magnitude and polarity of the control voltage derived from the resistor 9 for the particular unit under consideration.

In order to suppress radiation downward from the plane including the conductors of dipoles $D_1$–$D_{24}$, inclusive, a reflecting conductor 17 is disposed below each of the dipoles. These reflectors increase the useful energy in the desired direction of radiation and minimize minor spurious beams.

In considering the operation of the system of Fig. 1 and neglecting for the moment the functions of generators 13 and 15, it will be seen that the system comprises a plurality of directional signal radiators geometrically spaced in the above-mentioned first dimension and in the above-mentioned second dimension and that the signal radiators which are geometrically spaced in the first dimension are also electrically spaced by a time-phase displacement due to time-delay units F. Considering for the moment only the set of dipoles $D_1$–$D_6$, inclusive, in the condition where they are all excited in the same phase, it is seen that this is a known form of antenna array by which the radiation is concentrated relative to the radiation pattern of a single dipole. The concentration of energy into the beam takes place at the expense of the regions generally in the direction of the ends of the row of dipoles. Furthermore, it is seen that the reflectors 17 limit or suppress a substantial part of the radiation in the direction in which they are spaced from their associated dipole conductors. The resulting radiation pattern has a fan-shaped configuration with its major dimension vertically above the row of dipoles, its smallest dimension parallel to the row, and its intermediate dimension parallel to the individual dipoles.

The effect of adding the other sets of dipoles is to concentrate the radiated signal to the form of a sharply-concentrated beam. In the case where all rows are excited with a common phase the direction of this beam will be at right angles to the plane of the complete array. The reason for this is that the signals radiated from any pair of antennae are in phase only in the direction normal to the plane containing the dipoles.

Considering now the function of line-frequency generator 13, it is seen that it is effective to vary the frequency of the output of oscillator 11 cyclically and directly in accordance with its wave form, which is preferably a linear saw-tooth wave form. Due to the fact that the dipoles of each of the above-mentioned sets are electrically spaced by the time-delay networks F, the effect of this frequency variation is to vary the relative phase of the excitation of the dipoles of each set. Thus, for a frequency somewhat different than the nominal or mean frequency of the system, the signals radiated by each of a pair of adjacent dipoles of a set are not in phase in the vertical direction but are in phase in a direction displaced therefrom by an amount dependent upon the relative phase of antenna excitation. Thus, the line-frequency generator 13 comprises means for varying the phase of the signal as applied to the signal radiators of each of the above-mentioned sets at the frequency of the signal generated by line-frequency generator 13 as a result of the frequency variation of the output of oscillator 11 by line-frequency generator 13 and for effecting space-scanning by the concentrated radiated beam in lines in the above-mentioned one dimension.

If the effect of field-frequency generator 15 is now considered, it is seen that the voltage output of this generator, which is also preferably of a linear saw-tooth wave form, is effective to vary the relative phase of the dipoles which are spaced in the above-mentioned second dimension at the frequency of this generator. Reference is made to Fig. 1a for an explanation of the operation of this generator. Thus, curves 17a, 17b, 17c, and 17d represent the control voltages applied to phase shifters 12a, 12b, 12c, and 12d, respectively. It is thus seen that, at the beginning of the field-trace period, the signals applied to sets of dipoles $D_1$–$D_6$, inclusive, and $D_7$–$D_{12}$, inclusive are shifted in phase in one sense and by different amounts and that the signals applied to sets of dipoles $D_{13}$–$D_{18}$, inclusive, and $D_{19}$–$D_{24}$, inclusive, are correspondingly shifted in phase in the opposite sense and by different amounts. The result of this excitation is to tilt the transmitted beam in the above-mentioned second dimension because it is only in such a direction that the signals radiated by two adjacent dipoles which are spaced in the second dimension, for example, dipoles $D_6$ and $D_{12}$, are exactly in phase. Furthermore, it is seen that the amount of this tilt in the second dimension changes during the field-scanning period due to the change of relative excitation phase of the sets of dipoles effected by field-scanning generator 15. Specifically, the amount of tilt in the second dimension decreases to zero, at which time the beam is vertical and then increases in the opposite sense. The arrangement of Fig. 1 is thus effective to vary the direction of transmission of the sharply-concentrated beam in two directions to scan a predetermined space with the beam.

The system of Fig. 2 is one for locating a radiated-signal reflector, such as an airplane 20, and comprises a system for scanning a predetermined space including the airplane with a sharply-concentrated beam, such as was described in detail in connection with Fig. 1. Circuit elements of Fig. 2 which correspond to those of Fig. 1 have identical reference numerals. In addition to the elements of the system of Fig. 1, the locating system of Fig. 2 comprises means for receiving energy from the beam radiated by the antenna system 10 and reflected from the radiated-signal reflector 20. This means comprises a wave-signal receiver 21 having a substantially nondirectional antenna system provided by two dipole antennae 22, 23, antenna 22 preferably being parallel to the dipoles of antenna 10 and antenna 23 being at right angles thereto to provide a response to reflected waves having the polarization with which they were originally radiated or a polarization 90 degrees displaced from that radiated by antenna 10. The system includes a signal-reproducing device having an indicating area corresponding to the predetermined space scanned by the beam which is radiated from antenna system 10. This reproducing device comprises cathode-ray tube 24 of a conventional type having a fluorescent screen 25 which is the indicating area. The signal output of receiver 21 is applied to the input circuit of cathode-ray tube 24 to provide an indication of a received signal of restricted area on the indicating area 25. Cathode-ray tube 24 is so biased by a source 19 that it is cut off in the absence of a received signal. Suitable operating potentials are provided for cathode-ray tube 24 in a manner well understood in the art. There are also provided means for scanning the reproducing device 24 in synchronism with the radiated scanning beam from antenna system 10 so that the position of an indicating spot on fluorescent screen 25 is dependent upon the direction of the plane 20 from the antenna system 10. The scanning means comprises line-scanning plates 26, 27 and field-scanning plates 28, 29 to which are applied, respectively, scanning voltages of the wave forms and frequencies of the signals generated by generators 13 and 15, respectively, the line-scanning voltage being applied to plate 27 through a resistor 30.

The system of Fig. 2 also includes means responsive to the frequency variation of oscillator 11 for utilizing the received energy which is reflected from airplane 20 for selectively determining the distance of the airplane 20 from the locating system. This means comprises a heterodyne modulator 32 to one input circuit of which is applied a signal output of high-frequency generator 11 through a limiter 34 and to another input circuit of which is applied a signal output from receiver 21 through a limiter 33. The arrangement for indicating distance also comprises, coupled in cascade to the output circuit of modulator 32, a frequency-responsive network and detector 35, responsive to beat notes representing the difference frequency of the signal inputs to modulator 32 and preferably having a linear characteristic over the range of beat-note frequencies encountered in operation, and a distance indicator 36.

Due to the fact that more than one airplane may be in the space scanned by the beam from antenna system 10 at the same time, several indications, as indicated by the dots on fluorescent screen 25, may be produced simultaneously and the distance indicator 36 will, in general, indicate a distance for each of these airplanes. In order to provide means to facilitate the determination of which of the positions indicated on fluorescent screen 25 corresponds to a particular distance indication of distance indicator 36, the unit 38 is provided. The unit 38 comprises an unlocking device for distance indicator 36 such that, in the absence of a signal input to the unlocking device, a distance indication is not developed by indicator 36. In order to energize the unit 38 in accordance with any desired received direction indication on fluorescent screen 25, there is provided a photocell 40, around which there is a shield 41 having a relatively narrow aperture 42. The output circuit of photocell 40 is connected in cascade through an amplifier 43 and a differentiating circuit 44 to distance indicator 36.

Due to the fact that some time is required for a transmitted signal to travel from the antenna system 10 to the airplane 20 and back to the antenna system 22, 23, cathode-ray tube 24 tends to become excited by receiver 21 with a time delay which may be sufficient to give an inaccurate indication in the line-scanning direction although it will ordinarily be negligible in the relatively low-frequency field-scanning operation. Therefore, in order to compensate the direction indication on fluorescent screen 25 for this time delay, an output circuit of detector 35 is coupled across resistor 30.

Coming now to the operation of the locating system of Fig. 2, it will first be assumed that distance indicator 36 is not locked so that it is continuously in a condition for operation and temporarily the functions of the unlocking device 38 and the scanning compensating circuit including resistor 30 will be neglected. The operation of the beam-scanning arrangement including antenna system 10 being exactly the same as that described in connection with the description of the operation of Fig. 1, a further description thereof is unnecessary herein. In considering the operation of the remainder of the system of Fig. 2 under the conditions assumed, it will be seen that the cathode-ray beam of tube 24 is caused to scan the fluorescent screen 25 synchronously with the scanning of the predetermined sky space by the beam radiated from antenna system 10. Since tube 24 is normally biased beyond its cutoff point but is operated above its cutoff point for received signals from receiver 21, a spot indication is provided on the fluorescent screen 25 for each airplane in the field scanned. Also, since the signal received by receiver 21 is delayed in time with reference to the signal output of high-frequency oscillator 11 by the time interval required for the signal to travel from antenna 10 out to airplane 20 and back to the antenna 23, and since the frequency of oscillator 11 has been altered during this time by the action of line-frequency generator 13, the difference frequency of these two signals is a measure of the distance which the radiated beam travelled between antenna 10, airplane 20, and antenna system 22, 23. This difference frequency is, therefore, developed in the output circuit of heterodyne modulator 32 and an indication of distance is provided by means of the action of frequency-response network 35 which acts to convert the frequency value to an amplitude value, and distance indicator 36, which elements 35 and 36 together may be simply a conventional form of frequency indicator. In the preferred case, the frequency of the transmitted signal varies at a uniform rate with time and, therefore, any predetermined beat-frequency component derived from modulator 32 represents the same time delay or distance regardless of the direction in which the signal from antenna 10 was radiated.

Every airplane in the field scanned by the beam radiated from antenna 10, therefore, is effective to provide a direction indication on fluorescent screen 25 and a distance indication on distance indicator 36. It is for the purpose of determining which direction indication corresponds with a particular distance indication that the unit 38 is provided. Thus, in considering the operation of this portion of the system, it will be seen that, by moving aperture 42 across fluorescent screen 25, radiated energy from any of the direction-indicating spots on fluorescent screen 25 may be caused to energize photoelectric cell 40. The signal output of the cell 40 is amplified in amplifier 43, differentiated in differentiating circuit 44, and utilized to overcome the normal cutoff bias on distance indicator 36 so that it develops a distance indication only for the particular signal which is, at the moment supplying energy to photoelectric cell 40. The differentiating circuit 44 is provided so that the distance indicator is responsive only to relatively rapid changes in the signal input to photocell 40. Such a rapid change in signal input to photocell 40 will be developed each time the scanning beam of tube 24 becomes incident upon the particular spot on the fluorescent screen 25 which is being utilized to supply energy to photocell 40. The fluorescent material on the end of tube 24 will, in general, have a considerable time of luminescent decay which is disregarded by the differentiating circuit 44.

Coming now to the arrangement of Fig. 2 for compensating the direction indications on fluorescent screen 25 for the time required for the radiated beam to travel from antenna 10 to the airplane 20 and back to antenna system 22, 23, it will be seen that each time the signal input to tube 24 causes the tube to be operated above its cutoff point, the signal output from frequency detector 35 is also effective on the scanning plates 26, 27 of tube 24. The circuit is so adjusted that the amplitude and polarity of this signal output is effective momentarily to "back up" or retard the line-scanning potential of tube 24 to cause it to correspond with the corresponding line-scanning potential of generator 13 at the time the signal being received left the antenna 10. The compensating arrangement including resistor 30 may be subject to an error for airplanes which are near the line-scanning boundaries of fluorescent screen 25. However, in practice, the antenna system 10 can be mounted upon a movable platform so that, in general, the indication for any airplane can be brought well within the indicating area 25. On the other hand, to prevent false indications of the type just mentioned, a mask can be disposed around the fluorescent screen 25 to mask the indication of any plane which may give such a false reading.

The arrangement of Fig. 3 illustrates a modification of the system of Fig. 2 for indicating the component of direction corresponding to one of the scanning dimensions of antenna system 10 for all received signals. All of the portions of Fig. 2 may be included in the system of Fig. 3, although for simplicity some of the portions of Fig. 2 are not included, and elements which are similar in the preceding figures have identical reference numerals. The system of Fig. 3 comprises a cathode-ray tube 50 of conventional design having a fluorescent screen 51 and having its input circuit coupled to the wave-signal receiver 21 in the same manner as was described above in connection with the cathode-ray tube 24 of Fig. 2. However, one set of scanning plates 54, 55 of cathode-ray tube 50 is coupled directly across an output circuit of detector 35, while the other set of scanning plates 52, 53 is connected between the movable blade of a single-pole, double-throw switch 56 and ground. Line-scanning generator 13 is connected to one contact 57 of switch 56 through a resistor 30', the function of which is similar to that of resistor 30 of Fig. 2, and field-scanning generator 15 is connected to the other contact 58.

In considering the operation of the circuit of Fig. 3, it will first be assumed that the blade of switch 56 is operated to its upper contact 57 so that scanning plates 52, 53 are energized by line-scanning generator 13. The operation of elements, the reference numerals of which correspond to those of Fig. 2, is exactly as described in connection with the description of the operation of the arrangement of Fig. 2. Under the conditions assumed, when radiated energy is received by receiver 21, the tube 50 is operated above its cutoff point and, simultaneously, the cathode-ray beam is deflected in one direction in accordance with the distance of the airplane from which the reflected energy is received and is deflected in the other direction in synchronism with the line scanning of the radiated beam. Therefore, a trace is developed on fluorescent screen 51, consisting of a narrow upswing representing the airplane. The amplitude of such upswing, which may be measured from a horizontal indicating line on the end of the tube, represents the distance of the airplane, and its position laterally across the screen represents the corresponding line-scanning co-ordinate. Similarly, the blade of switch 56 may be closed in its lower contact 58 and the corresponding field-scanning co-ordinate may be obtained. Thus, the modification of the invention illustrated in Fig. 3 is effective to provide an indication both of direction and of distance for any airplane in the field scanned by the beam from antenna 10. If two airplanes are present at a given time in this field, indications will be received for each airplane. However, in general, these airplanes will not be at the same distance and, for this reason, the line-scanning and field-scanning co-ordinates corresponding to each airplane can be readily determined. It will be fully understood that the indicator tube 50 of Fig. 3 can be used in conjunction with the indicator tube 24 of Fig. 2, and it will be seen that the indications provided by screens 25 and 51 together are analogous to the three projections of a set of points in space.

While applicant does not intend to limit the invention to any particular design constants, the following values are appropriate for an airplane-locating system:

Mean or normal frequency
  for oscillator 11_____ 100–1000 megacycles
Frequency of line-scan-
  ning generator 13_____ 500–5000 cycles
Frequency of field-scan-
  ning generator 15_____ 10–30 cycles
Time delay of networks F_ 5 to 10 periods at normal carrier frequency While a nondirectional antenna has been illustrated in connection with receiver 21, it will be appreciated that there are particular advantages to be gained in utilizing an antenna structure for the receiver which is similar to antenna 10. If such an antenna is used it has the property of being highly directional for only the signals received due to reflection as described above. The reason for this is that its directive properties vary with frequency in a manner analogous to that described above in connection with the description of the operation of antenna 10. If an antenna similar to that of antenna 10 is used at the receiver, it is necessary to provide phase shifters corresponding to 12a–12d, inclusive, of Fig. 1, the corresponding phase shifters at the receiver being controlled in exactly the same manner that those at the transmitter are controlled. In such a receiving system, the receiver proper is analogous to high-frequency oscillator 11 and it is unnecessary to provide the counterpart of line-frequency generator 13 in the receiving system.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for locating a radiated-signal reflector comprising, a radiating system having a radiation characteristic effectively in the form of a sharply-concentrated beam, means for applying a carrier signal to said radiating system, means for varying the frequency of said carrier signal to scan a predetermined space in at least one direction with said beam, means for receiving energy from said radiated beam reflected from said reflector and for utilizing said received energy to indicate the direction of said reflector, and means responsive jointly to said frequency-modulated signal and said reflected signal for determining the distance of said radiated-signal reflector from said locating system.

2. A system for locating a radiated-signal reflector comprising, a radiating system having a radiation characteristic effectively in the form of a sharply-concentrated beam, means for applying a carrier signal to said radiating system, means for varying the frequency of said carrier signal to scan a predetermined space in one direction with said beam, means for receiving energy from said radiated beam reflected from said reflector and for utilizing said received energy to indicate the direction of said reflector, means for heterodyning the transmitted signal and said received reflected signal to derive beat notes dependent upon the frequency difference therebetween, and a requency detector responsive to said beat notes for indicating the distance of said radiated-signal reflector from said locating system.

3. A system for locating a radiated-signal reflector comprising, a radiating system having a radiation characteristic effectively in the form of a sharply-concentrated beam, means for applying a carrier signal to said radiating system, means for scanning a predetermined space with said beam, means for receiving energy from said radiated beam reflected from said reflector and for utilizing said received energy to indicate the approximate direction of said reflector, and means for compensating said indication for the time required for said received energy to travel from said radiating system to said means for receiving the radiated beam reflected from said reflector.

4. A system for locating a radiated-signal reflector comprising, a radiating system having a radiation characteristic effectively in the form of a sharply-concentrated beam, means for applying a carrier signal to said radiating system, means for scanning a predetermined space with said beam, means for receiving energy from said radiated beam reflected from said reflector, a reproducing device including an indicating area corresponding to said predetermined space, means responsive to said received energy for producing an indication thereof of restricted area on said indicating area, means for scanning said reproducing device in synchronism with said radiated scanning beam, and means for correcting said indication to compensate for the distance travelled by the transmitted signal between said radiating system and said means for receiving energy from said radiated beam, whereby the position of said indication on said indicating area is dependent upon the direction of said reflector.

5. A system for locating a radiated-signal reflector comprising, a radiating system including a plurality of signal radiators geometrically spaced in two dimensions, a source of wave signals, means for individually applying wave signals from said source to said signal radiators for directive radiation effectively in the form of a sharply-concentrated beam, means for effectively varying the relative phase of said signals as applied to said signal radiators which are spaced in one of said dimensions at a first predetermined frequency, means for varying the relative phase of said signals as applied to said signal radiators which are spaced in the other dimension at a second predetermined frequency, thereby to vary the direction of transmission of said radiated beam in two dimensions to scan a predetermined space, means for receiving energy from said radiated beam reflected from said reflector, a reproducing device including an indicating area corresponding to said predetermined space, means responsive to said received energy for producing an indication thereof of restricted area on said indicating area, and means for scanning said reproducing device in synchronism with said radiated scanning beam, whereby the position of said indication on said indicating area is dependent upon the direction of said reflector.

6. A system for locating a plurality of radiated-signal reflectors comprising, a radiating system having a radiation characteristic effectively in the form of a sharply-concentrated beam, means for applying a carrier signal to said radiating system, means for varying the frequency of said carrier signal to scan a predetermined space in one direction with said beam, means for receiving energy from said radiated beam reflected from said reflectors and for utilizing said received energy to indicate the directions of said reflectors, and means for selectively indicating the distance of any of said signal reflectors from the locating system.

7. A system for locating a radiated-signal reflector comprising, a radiating system including a plurality of signal radiators geometrically spaced in two dimensions and means for electrically spacing them in one of the two dimensions, a source of high-frequency wave signals, means for individually applying wave signals from said source to said signal radiators for directive radiation effectively in the form of a sharply-concentrated beam, means comprising said electrical spacing means and means for varying the frequency of said wave signals in a predetermined cyclic manner effectively to vary the relative phase of the signals as applied to said radiators which are spaced in said one dimension at a first predetermined frequency, means for varying the relative phase of said signal as applied to said signal radiators which are spaced in the other dimension at a second predetermined frequency thereby to vary the direction of transmission of said radiated beam in two dimensions to scan a predetermined space, means for receiving energy from said radiated beam reflected from said reflector, a reproducing device including an indicating area corresponding to said predetermined space, means responsive to said received energy for producing an indication thereof of a restricted area on said indicating area, means for scanning said reproducing device in synchronism with said radiated scanning beam, whereby the position of said indication on said indicating area is dependent upon the position of said reflector, and means dependent upon the frequency variation of said carrier signal and responsive to the frequency of said received energy for indicating the distance of said reflector from said locating system.

8. A system for locating a plurality of radiated-signal reflectors comprising, a radiating system having a radiation characteristic effectively in the form of a sharply-concentrated beam, means for applying a carrier signal to said radiating system, means for varying the frequency of said carrier signal to scan a predetermined space in one direction with said beam, means for receiving energy from said radiated beam reflected from said reflectors and for utilizing received energy to indicate the distance and the component of direction corresponding to said scanning direction for all of said signal reflectors.

9. A system for locating a plurality of radiated-signal reflectors comprising, a radiating system having a radiation characteristic effectively in the form of a sharply-concentrated beam, means for applying a carrier signal to said radiating system, means for varying the frequency of said carrier signal to scan a predetermined space in one direction with said beam, a cathode-ray signal reproducing tube, means for receiving energy from said radiated beam reflected from said reflectors and for utilizing received energy to control the beam of said tube, means for deriving from said received signals and said frequency-modulated carrier signal a signal indicative of distance for each of said signal reflectors, means for deflecting the cathode-ray beam of said tube in one direction in accordance with said last-mentioned signals, and means for deflecting the cathode-ray beam of said tube in another direction in synchronism with said scanning of said radiated beam.

ARTHUR V. LOUGHREN.